United States Patent Office
3,597,393
Patented Aug. 3, 1971

3,597,393
FUNCTIONALLY SUBSTITUTED HIGHLY ORDERED AZO-AROMATIC POLYAMIDES
Hartwig C. Bach and Helmuth E. Hinderer, Durham, N.C., assignors to Monsanto Company, St. Louis, Mo.
No Drawing. Filed Jan. 21, 1969, Ser. No. 792,770
Int. Cl. C08g 20/20, 20/30, 20/32
U.S. Cl. 260—47CP                        4 Claims

ABSTRACT OF THE DISCLOSURE

A class of ordered fiber and film forming aromatic polyamides derived from certain substituted symmetrical aromatic azo diamines has been found to possess excellent thermal, mechanical and electrical properties useful in the manufacture of fibers, films and other shaped articles.

---

This invention relates to a novel class of polyamides and to fibers, films and other shaped articles derived therefrom.

More particularly, the invention relates to the preparation of fiber and film-forming polyamides of a particular class of substituted symmetrical aromatic azo diamines. The ordered aromatic azo polyamides of this invention can be prepared by conventional polymerization techniques to proved products having improved mechanical and thermal properties.

Accordingly, it becomes an object of this invention to provide a new class of ordered polymers from substituted symmetrical aromatic azo diamines. These and other objects will become apparent to those skilled in the art from the ensuing description.

The novel fiber and film-forming polyamides of this invention are composed of recurring units represented by the following structural formula:

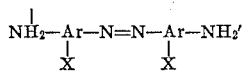

wherein the radical

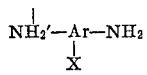

is an asymmetrical divalent aromatic radical, wherein X is a substituent. Ar may be single, fused or multi-ring system and may be carbocyclic, heterocyclic or contain a combination of carbon cycles and heterocycles and X is an acid group, a salt thereof, a derivative thereof hydrolyzable to an acidic group, a mercapto group or derivative thereof hydrolyzable to a mercapto group or an hydroxyl group or derivative thereof hydrolyzable to an hydroxyl group.

The symmetrical diamines useful in the preparation of the polyamides of this invention are represented by the formula

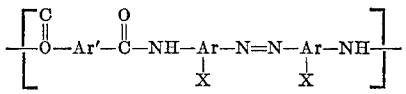

They may be prepared by an oxidative coupling reaction which involves dimerization of certain asymmetrical aromatic diamines represented by the formula

where NH$_2'$— represents a primary amino group possessed of basicity different from the NH$_2$— amino group, Ar and X being the same as above indicated. Ar is further characterized by benzenoid unsaturation and possessing resonance in the classic sense. The X substituted Ar radicals include those derived from X substituted benzene, naphthalene, biphenyl and bridged biphenyl such as diphenyl sulfone and diphenyl ether. The X substituted divalent heterocyclic radicals may contain one or more heteroatoms such as

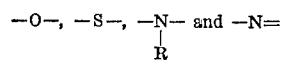

representative of which are X substituted divalent radicals derived from pyridine, oxadiazole, thiazole, imidazole, pyrimidine and the like. In the case of multicyclic ring systems individual rings may be linked through aromatic carbon to aromatic carbon bonds or through divalent aliphatic, alicyclic or inorganic linking groups such as

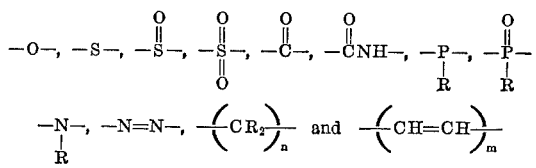

where R represents hydrogen or lower alkyl, $n$ is 1 to 6 and $m$ is 1 or 2.

The substituent, X, attached to the diamine used in this invention represents a mercapto, an hydroxyl or an acid or acid salt group or a derivative thereof which may be hydrolyzed to a mercapto, an hydroxyl group, or acid group, respectively.

Typical of the acid groups contemplated within the scope of this invention are carboxylic acid, sulfinic acid, sulfonic acid, oxysulfonic acid, phosphoric acid, oxyphosphonic acid, alkali metal, alkaline earth metal, ammonia and amine salts thereof. The derivatives hydrolyzable to the acid functions described are typically the acid halides including the iodide, fluoride, chloride and bromide, esters of phenols, and aliphatic and alicyclic alcohols having less than 12 carbon atoms and amides of ammonia, primary and secondary amines having up to 12 carbon atoms. Common derivatives of mercapto and hydroxyl substituents which may be hydrolyzed to the mercapto or hydroxyl groups are aromatic, aliphatic and alicyclic ethers, having up to 12 carbon atoms, and esters of aromatic, aliphatic and alicyclic carboxylic acids having up to 12 carbon atoms.

The X substituents according to this invention are attached directly to a cyclic aromatic carbon atom of the Ar radical and typically include groups such as,

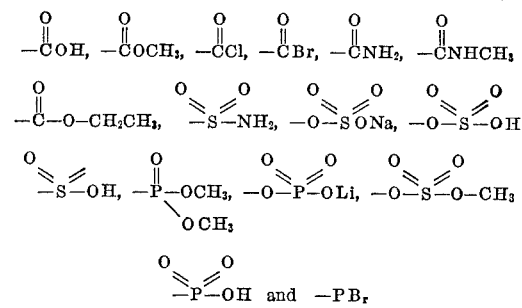

Representative of the mercapto and hydroxyl substituents and derivatives hydrolyzable to mercapto and hydroxyl substituents are

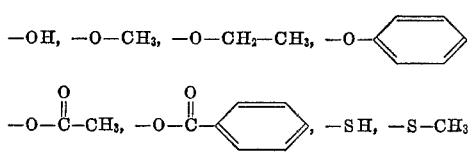

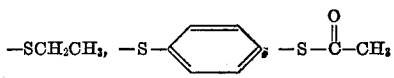

and the like.

As a general rule the amides, ethers and esters function as intermediates both for the diamines and polymer preparations as hereinafter described by blocking the reactive mercapto, hydroxyl or acid substituents prior to manufacture of shaped articles from the fiber and film-forming polymers. Thus, in the preparation of a symmetrical aromatic azo diamine bearing a carboxylic acid or carboxylic acid chloride group, a functional derivative which blocks the reactivity of such group may be employed in the intermediate processes. Typical of the diamines contemplated within the scope of this invention are the following:

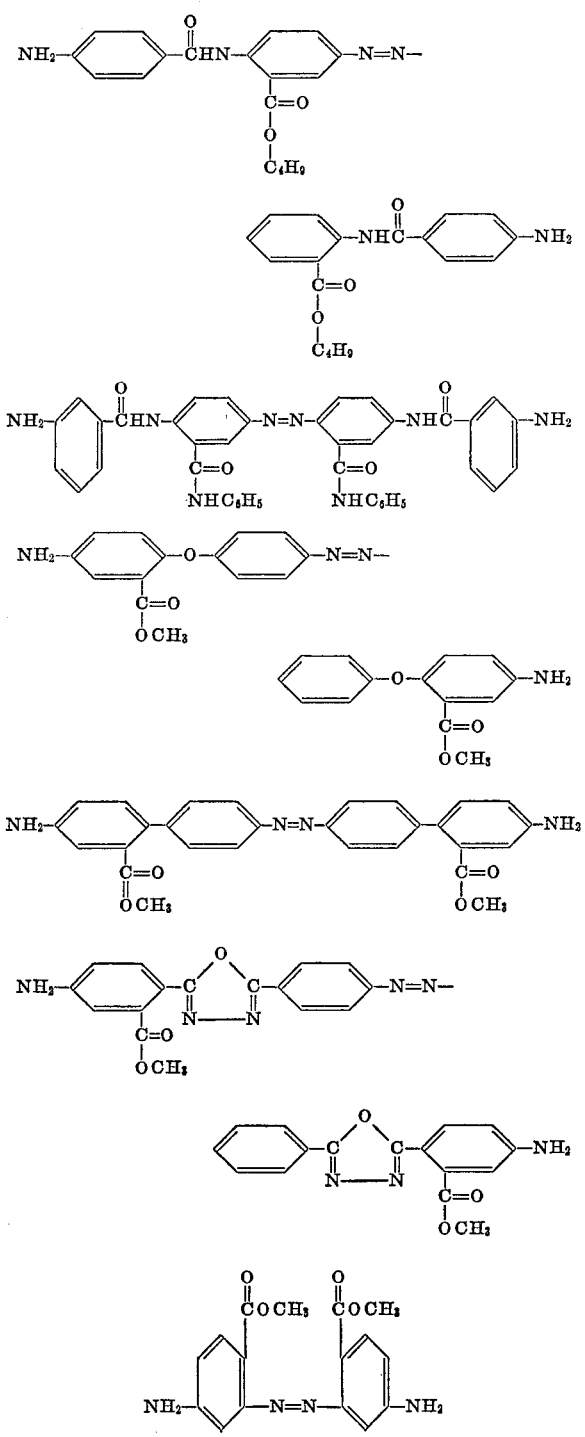

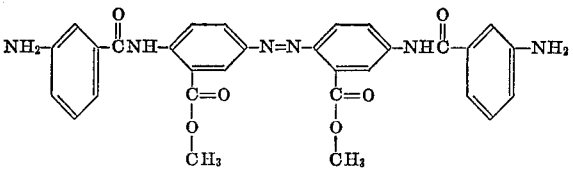

The reactant diamines employed to prepare the azo diamines used in this invention are generally known in the art and can be prepared by means already known to those skilled in the art.

The symmetrical aromatic azo diamines of this invention can be prepared by the oxidative coupling of asymmetrical aromatic diamines in solution utilizing a cupric ion complexed with a nitrogen base. Preferably, the oxidative solution dimerization is conducted as a catalytic process with a cupric-cuprous redox couple complexed with a nitrogen base as the catalyst, a nitrogen base as the solvent and molecular oxygen as the primary oxidant.

The active catalyst system is preferably obtained by oxidation of a cuprous salt in the presence of a nitrogen base, although some cupric salts such as cupric acetate may also be used. Any cuprous salt may be used in the practice of this invention provided that it forms a complex with the nitrogen base that is soluble in the reaction medium and that it is capable of existing in the cupric state. The particular salt used has no effect on the type of product obtained. Typical examples of cuprous salts suitable for the process are cuprous chloride, cuprous bromide, cuprous sulfate, cuprous acetate, cuprous benzoate and the like. The use of cupric salts is generally less desirable in the catalyst preparation although cupric acetate is quite effective.

It is believed that cupric ion complexed with a nitrogen base, complexes with the amino groups of the starting diamine, then oxidizes them and aids in the coupling of the resulting species. During this reaction cuprous salt or complex is formed which is reoxidized by oxygen (or its precursors such as $H_2O_2$) to the cupric state. Based on this mechanism, chemical oxidants also appear to be useful which can oxidize the cuprous ion to the cupric ion.

Since the reaction does not destroy the catalyst, only a small catalytic amount of cuprous or cupric salt needs to be used, from about 0.1 to 10 mole percent, based on the moles of aromatic diamine to be oxidized, although larger amounts can be used, as desired.

Nitrogen bases which may be used as a component of the catalyst as well as the reaction medium include all nitrogen bases except those which are oxidized by the catalyst. It is preferred to have the basicity of the nitrogen base as close as possible to that of the preferentially oxidizable amino group of the primary diamine starting material in order to help the reaction proceed at the most optimum rate and give better yields.

Suitable nitrogen bases include various amides such as phosphoramides, carbonamides and sulfonamides. Examples of such amides are hexamethylphosphoramide, dimethylacetamide, dimethylformamide, dimethylpropionamide, diethylacetamide, N-acetylpyrrolidone, N-ethyl pyrrolidone and the like. Of these amide bases, dimethylacetamide and hexamethylphosphoramide are generally preferred.

Other nitrogen bases, suitable for carrying out the process of this invention, include aliphatic tertiary amines such as triethyl amine, tributylamine, diethylmethylamine and cyclic amines such as pyridine, n-alkyl piperidines, quinolines, isoquinolines, N-alkyl morpholines and the like. Among these, pyridine is preferred.

Mixtures of bases which form a part of the catalyst system may also be used. They may also be used in combination with compounds which act only as the reaction medium. For example, nitrobenzene is a good reaction medium, and may be used in combination with one of the aforementioned bases. Other inert solvents which do not interfere with the catalyst or are not oxidized to any appreciable extent by it may also be used as the reaction medium. It was found, in the course of this work, that reaction media in which the products of the reaction are relatively insoluble lead to a cleaner, simpler separation of product from catalyst and by-products, thus increasing the yield of symmetrical diamine obtained.

In a preferred mode of operation of the process, molecular oxygen is used as the primary oxidant and may be introduced into the reaction medium by diffusion or injection. Either 100 percent oxygen or gas mixtures containing oxygen may be used. In addition, other compounds capable of supplying oxygen, such as hydrogen peroxide, may be used.

The order of addition of the various reactants is not critical. In one preferred mode of carrying out this invention, the catalyst may be prepared by oxidizing cuprous chloride in a base such as pyridine. The asymmetrical primary aromatic diamine is then added and oxidatively coupled by the addition of oxygen until about the theoretical volume has been consumed.

Alternatively, the catalyst may be prepared in the same manner as described above and then added to a chilled solution of the primary aromatic diamine in the appropriate reaction medium, prior to the addition of oxygen. In either case, the amount of oxygen consumed can be measured with great accuracy, by using a closed system and a gas buret.

The preparation of the catalyst and the oxidative coupling reaction may be carried out in the temperature range of from about −30° C. to about 120° C., preferably from about −20° C. to about 70° C. It has been found that the catalyst preparation may be carried out conveniently and preferably at room temperature. The rate of reaction is satisfactory at these temperatures and a very efficient catalyst is produced.

The surprising feature of the oxidative coupling reaction of asymmetrical aromatic diamines is that the dimer product obtained is essentially the only product resulting from the process. The selective oxidation of one amino group of the asymmetrical diamine, to the exclusion of the other amino group, is indeed unexpected. It is believed that the catalyst reacts preferentially with the more basic amino groups of the starting material, as long as they are present in the mixture. This theory is further strengthened by the fact that greater care must be taken in controlling the reaction conditions, as the difference in basicity of the starting material and product becomes smaller, in order to obtain high yields of pure dimer.

Determination of the basicities of the amino groups of the starting diamine and the product can be helpful in predicting suitable conditions for carrying out the reaction. In general, as the difference in basicity between the amino groups to be oxidized of the starting material and product increases, the range of reaction conditions which can be used satisfactorily in the practice of this invention is broadened; conversely, as the difference in basicity becomes smaller, the range of conditions is narrowed.

The optimum reaction conditions to be used for carrying out the process will be dependent in large part on the structure and molecular weight of the starting material and final product. These conditions may be easily optimized by those skilled in the art.

The aromatic polyamides of this invention may be prepared by reacting a symmetrical aromatic azo diamine of the type above-described with an aromatic diacid halide represented by the formula:

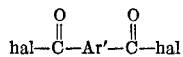

wherein Ar is a divalent aromatic radical and hal represents a halogen. The aromatic diacide halides useful in this invention are generally known in the art and have been used in the formation of other polyamides. They include diacide halides such as isophthaloyl chloride, terephthaloyl chloride, bibenzoyl chloride, 2,6-naphthalene dicarbonyl chloride and the like.

Examples of the ordered condensation polymers of this invention, obtainable by the reaction of the above diamines with diacid halides and embraced by the general formula previously shown are the following:

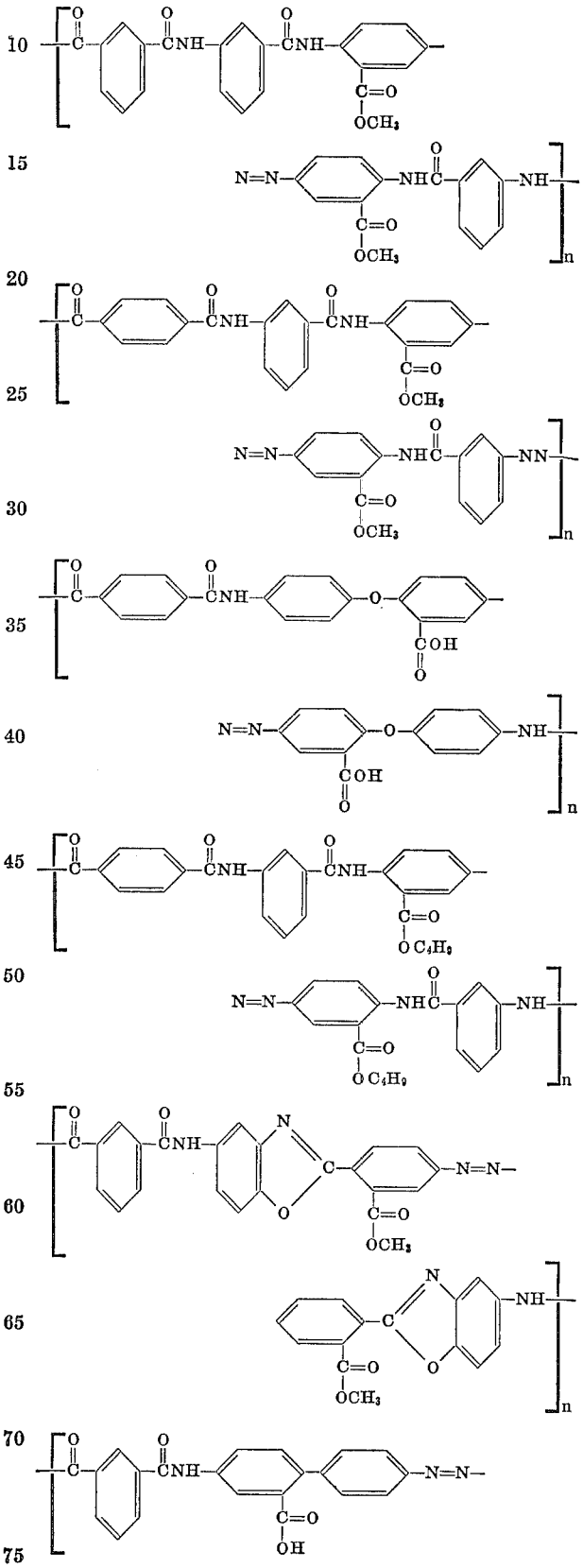

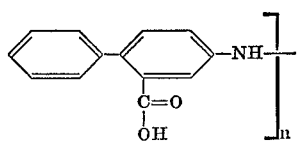

The polymers of this invention may be prepared using well known solution or interfacial reaction techniques. The solution method is usually preferred, since the polymer can be spun directly to fibers from the polymerization solution without filtering, washing or drying.

The solution method generally involves dissolving or slurrying the symmetrical aromatic azo diamine monomer in a suitable solvent for the polymer, which is inert to the polymerization reaction. Among such solvents there may be mentioned dimethylacetamide, N-methyl-2-pyrolidone, hexamethylphosphoramide (HPT) and the like or mixtures of the above. These solvents are rendered more effective in many instances by mixing them with a small amount, up to 10 percent of an alkali or alkaline earth metal salt, such as lithium chloride, magnesium bromide, calcium chloride and the like. The preferred solvent for the polymerization reaction is dimethylacetamide or dimethylacetamide containing a small amount of dissolved salts.

In the preparation of polymers, the diamine monomer solution is cooled to between 20 and −30° C. and the diacid halide is added, either as a solid or in a solution of one of the aforementioned solvents. The mixture is stirred until polymerization is substantially complete and a high molecular weight is attained. The viscous polymer solution may be spun per se or the polymer may be isolated by pouring the mixture into a non-solvent, washing and drying the polymer and then preparing the spinning solution.

For best results, the hydrogen halide, formed as a by-product of the polymerization reaction, should be neutralized or removed to prevent its harmful effects to the resulting articles. Neutralization may be conveniently accomplished by adding a proton acceptor such as an alkali or alkaline earth metal base, to form a salt and water. Suitable proton acceptors include sodium carbonate, calcium carbonate, lithium hydroxide and the like. As a result of the neutralization reaction, the polymers may be further dissolved in the solvent, containing an amount of salt and water proportional to the amount of hydrogen halide present. Although not absolutely essential the addition of small amounts of water improves the stability of these polymer solutions.

The amounts of the various reactants which may be employed in the polymerization reaction will, of course, vary according to the type of polymer desired. In most instances, however, substantially equimolecular quantities or a slight excess of diamines to diacid halide may be used. The number ($n$) of repeat units and viscosity of the polymers of this invention are reflective of molecular weights necessary to achieve fiber and film forming properties. Generally, these include polymers having inherent viscosities above 0.1 when measured as a 0.1 percent solution in a suitable solvent at 25° C.

The interfacial polymerization reaction is conducted by mixing water, an emulsifier and the diamine which may be in the form of its dihydrochloride. A proton acceptor, such as sodium carbonate is then added and the mixture stirred rapidly. During this rapid stirring, a solution of the dicarbonyl monomer in an inert organic solvent such as chloroform, methylene chloride, or tetrahydrofuran is added, and the mixture stirred until the polymerization reaction is complete. The polymer is then isolated by filtration, followed by washing and drying. Suitable emulsifying agents for interfacial polymerization include anionic and nonionic compounds such as sodium lauryl sulfate and the like.

EXAMPLE I

Preparation of 3,3'-dicarbomethoxy-4,4'-di(3-aminobenzamido)azobenzene

The catalyst was prepared by oxidizing 2.0 g. of cuprous chloride in a mixture of 120 ml. of DMAc and 40 ml. of pyridine using 131 ml. of oxygen. 2'-carbomethoxy-3,4'-diaminobenzanilide (12.90 g., 0.045 mole) was added and oxidative coupling conducted at 21–22° C. for 113 min. during which time 604 ml. of oxygen was consumed. This volume is slightly higher than that calculated for dimerization (543 ml.), but the rate of consumption had become substantially slower by the time the volume required for dimerization had been used. The yellow-green product was filtered off and dried in vacuo giving 8.5 g. (66.5% yield) of material melting at 265.5° C. After recrystallization from pyridine the material melted at 265.5–266.5° C. (dec.).

*Analysis.*—Calcd. for $C_{30}H_{26}N_6O_6$ (percent): C, 63.59; H, 4.87; N, 14.83. Found (percent): C, 62.98; H, 4.55; N, 14.64.

Thin layer chromatography of the alkaline hydrolysate of this new azodiamine showed m-aminobenzoic acid as a hydrolysis product This observation is evidence that coupling occurred via the 4'-amino group.

Preparation of the polyamide

Isophthaloyl chloride (0.406 g., 0.002 mole) was added at 0° C. to a slurry of 1.132 g. (0.002 mole) of N,N'-bis(m-aminobenzoyl) 3,3'-bis-carbomethoxy-4,4'-diaminoazobenzene in 8.6 ml. of dimethylacetamide (DMAc)/5% LiCl. The mixture was stirred 5 min. at 0° C., diluted with 4 ml. of DMAc/5% LiCl, and stirred 4 hrs. at room temperature. The coagulated yellow polymer had an inherent viscosity (solution of 0.1 g. of polymer in 20 ml. of DMAc/5% LiCl, 30° C.) of 0.46. The polymer thus prepared is represented by recurring units of the following formula:

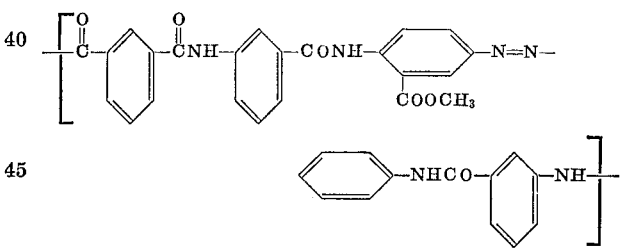

EXAMPLE II

Preparation of 3,3'-dicarbobutoxy-4,4'-di(3-aminobenzamido)azobenzene

The catalyst was prepared by oxidizing 1.0 g. of cuprous chloride with oxygen in a mixture of 60 ml. of DMAc and 20 ml. of pyridine. There was added 6.54 g. (0.020 mole) of 2'-carbobutoxy-3,4'-diaminobenzanilide and the coupling allowed to proceed for 48 min. at 24.5–30° C. (exotherm) utilizing 245 ml. of oxygen (calculated for dimerization, 244 ml.). To the filtered solution was added water (400 ml.), and the resultant pasty precipitate was collected (centrifugation), washed and dried in vacuo. The green, amorphous material weighed 5.95 g. (91.3% crude yield) and melted over a wide range beginning at 225° C.

Polymer preparation

Terephthaloyl chloride (0.203 g., 0.001 mole) was added at 0° C. to a slurry of 0.550 g. (0.001 mole) of N,N'-bis(m-aminobenzoyl) - 3,3' - dicarbobutoxy - 4,4'-diamino-azobenzene in 8 ml. of DMAc/5% LiCl. The ice-water bath was removed after 5 min., and the very dark green-brown dope was stirred at ambient temperature for 18 hrs. The polymer was isolated by coagulation in water. The dark green-yellow powder weighed 0.74 g. and had an inherent viscosity (solution of 0.1 g. of polymer in 20 ml. of conc. $H_2SO_4$) (25° C.) of 0.20.

The polymer thus prepared is represented by recurring units having the following formula:

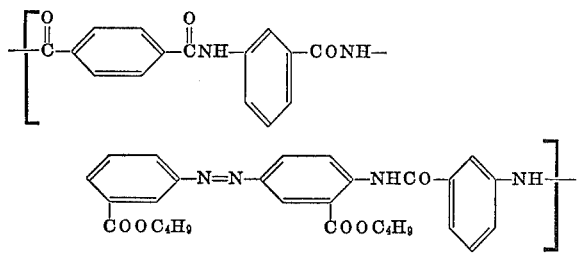

EXAMPLE III

Terephthaloyl chloride (0.41 g., 0.002 mole) was added at 0° C. to a slurry of 1.13 g. (0.002 mole) of N,N'-bis(m-aminobenzoyl) - 3,3' - bis-carbomethoxy-4,4'-diamino-azobenzene in 15 ml. of DMAc/5% LiCl. The mixture was stirred 10 min. at 0° C., 2 hrs. at room temperature, then neutralized with lithium carbonate (0.3 g.). A self-supporting film was cast from the dope. The coagulated polymer had an inherent viscosity (solution of 0.5 g. of polymer in 20 ml. of conc. $H_2SO_4$, 25° C.) of 0.23 and is represented by recurring units having the formula,

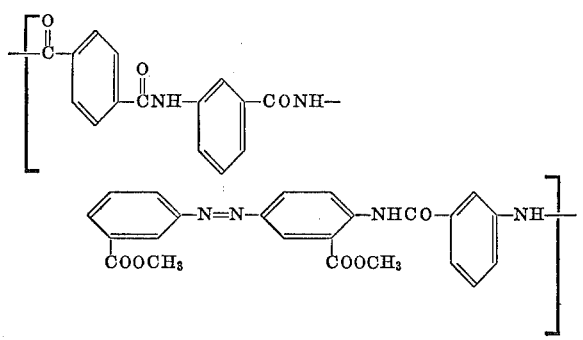

EXAMPLE IV 3,3' - dicarboxy - 4,4'-bis(4-aminophenoxy)azobenzene was synthesized from 2-carboxy-4-nitro-4'-acetamidodiphenyl ether (Goldberg and Walker, J. Chem. Soc. 1953, 1352) in a four-step synthesis:

(1) esterification with methanol to 2-carbomethoxy-4-nitro-4'-acetamidodiphenyl ether (I)

(2) conventional hydrogenation with Pd on carbon to 2 - carbonmethoxy-4-amino-4'-acetamido-diphenyl ether (II)

(3) catalytic oxidative coupling as follows: 15 g. of (II) were added to an oxidized (with oxygen) solution of 2.0 g. of cuprous chloride in 200 ml. of pyridine. The reaction mixture absorbed 541 ml. of $O_2$ in 6 hours at temperatures between 27 and 47.5° C. The resulting product, 3,3' - dicarboxy-4,4'-bis(4-acetamido phenoxy) azo benzene (III) (71% crude yield) was filtered off and recrystallized from pyridine. M.P. 267° (dec.)

(4) hydrolysis of III to give the final product. 5.3 g. of III were refluxed for 38 hours with a mixture of 4.7 g. of KOH, 100 ml. of water and 30 ml. of ethanol. By acidification with 50% acetic acid, a yellow compound was obtained. M.P. 273° C. (dec.)

*Analysis.*—Calculated for $C_{26}H_{20}N_4O_6$ (percent): C, 64.46; H, 4.16; N, 11.57. Found (percent): C, 64.19; H, 4.72; N, 11.12.

Polymer preparation

Terephthaloyl chloride (0.203 g., 0.001 mole) was added at 0° C. to a solution of 0.484 g. (0.001 mole) of 3,3'-dicarboxy-4,4'-bis(p-amino-phenoxy)-azobenzene in 5 ml. of DMAc. The reaction mixture was stirred at 0° C. for 5 min., at room temperature for 2 hrs. The yellow, fluffy polymer obtained by coagulation had an inherent viscosity (solution of 0.1 g. of polymer in 20 ml. of conc. $H_2SO_4$, 25° C.) of 1.3. A strong, flexible film was obtained from a solution of 0.2 g. of polymer in 1.5 ml. of DMAc. The films could be drawn at 270° C., to produce highly oriented, crystalline films. These films exhibited excellent resistance to thermal and U.V. degradation. The polymer is represented by recurring units having the formula:

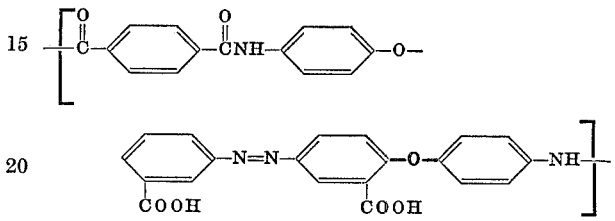

The ordered aromatic polyamides of this invention are useful for thermally resistant fibers, films and other shaped articles. The functional substituents on the polymer chains serve as cross-linking sites and ion exchange sites. Moreover, the presence of substituent groups, particularly in salt form appears to enhance the mechanical properties of shaped articles such as fibers.

We claim:

1. An ordered fiber or film-forming aromatic polyamide consisting essentially of recurring units represented by the formula

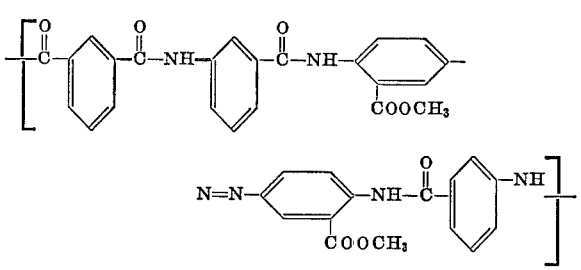

2. An ordered fiber or film-forming aromatic polyamide consisting essentially of recurring units represented by the formula

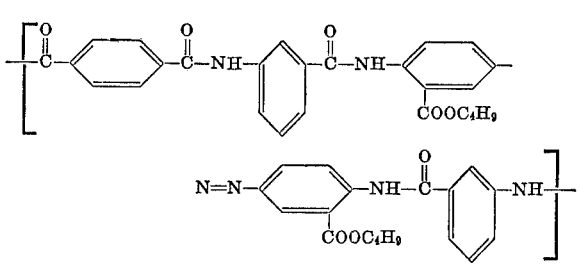

3. An ordered fiber or film-forming aromatic polyamide consisting essentially of recurring units represented by the formula

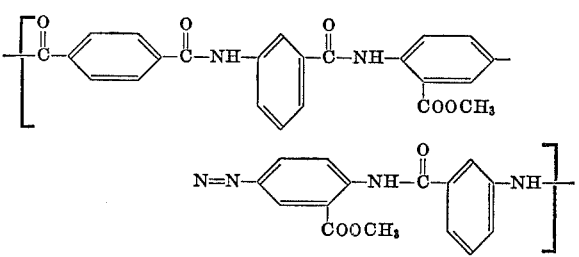

4. An ordered fiber or film-forming aromatic polyamide consisting essentially of recurring units represented by the formula
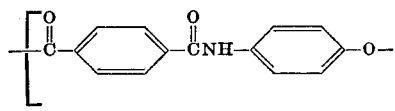
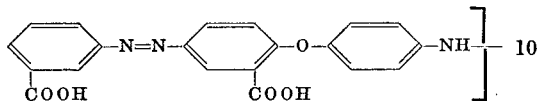
References Cited
UNITED STATES PATENTS
2,994,693 8/1961 Blake et al. _____ 260—144
3,403,200 9/1968 Randall _____ 260—857
WILLIAM H. SHORT, Primary Examiner
L. L. LEE, Assistant Examiner
U.S. Cl. X.R.
260—30.2, 30.6R, 32.6N, 63R, 78A, 78TF